United States Patent Office 3,304,285
Patented Feb. 14, 1967

3,304,285
STABILIZATION OF RUBBER WITH A
MIXTURE OF DIAMINES
William L. Cox, Cuyahoga Falls, Ohio, assignor to Universal Oil Products Company, Des Plaines, Ill., a corporation of Delaware
No Drawing. Filed Nov. 22, 1965, Ser. No. 509,194
4 Claims. (Cl. 260—45.9)

This application is a continuation-in-part of co-pending application Serial No. 102,398, filed April 12, 1961, now Patent No. 3,247,161, and relates to the stabilization of rubber by incorporating therein a novel synergistic mixture, and to the synergistic mixture as a novel composition.

As is now well known, rubber undergoes cracking due to attack by ozone in the atmosphere. In addition, rubber undergoes deterioration due to oxygen in the atmosphere. It has been well established at the present time that the deterioration caused by ozone and the deterioration caused by oxygen are different and that both types of deterioration will occur when both ozone and oxygen are present.

The novel synergistic mixture of the present invention serves to prevent cracking of the rubber due to ozone to a greater extent than is obtained through the use of either of the components of the mixture separately. In addition, the synergistic mixture also serves to retard deterioration of the rubber due to oxidation.

The phenylenediamine antiozonants include N,N'-dicycloalkyl-p-phenylenediamine and particularly N,N'-dicyclohexyl-p-phenylenediamine. Other N,N'-dicycloalkyl-p-phenylenediamines include N,N'dicyclopropyl-p-phenylenediamine, N,N'-dicyclobutyl-p-phenylenediamine, N,N'-dicyclopentyl-p-phenylenediamine, N,N'-dicycloheptyl-p-phenylenediamine, N,N'-dicyclooctyl-p-phenylenediamine, N,N' - dicyclononyl-p-phenylenediamine, N,N' - dicyclodecyl-p-phenylenediamine, etc.

Surprisingly, it has been found that certain compounds which posses antioxidant properties also produce a synergistic effect when used in combination with the antiozonants hereinbefore set forth. As will be shown by the examples appended to the present specifications, these additional compounds in themselves possess substantially no antiozonant properties. Therefore, it is surprising that they should increase the antiozonant properties of the antiozonants hereinbefore set forth.

These additional compounds are antioxidants and therefore will contribute antioxidant properties to the rubber, in addition to their synergistic effect in enhancing the antiozonant properties of the p-phenylenediamine antiozonants hereinbefore set forth.

The compounds contributing to the synergistic effect are N-phenyl-N'-alkylphenyl-p-phenylenediamines. Illustrative compounds include N-phenyl-N'-methylphenyl-p-phenylenediamine, N-phenyl-N'-ethylphenyl-p-phenylenediamine, N-phenyl-N'-propylphenyl-p-phenylenediamine, N-phenyl-N'-butylphenyl-p-phenylenediamine, N-phenyl-N'-pentylphenyl-p-phenylenediamine, N-phenyl-N'-hexylphenyl-p-phenylenediamine, N - phenyl-N'-heptylphenyl-p - phenylenediamine, N-phenyl-N'-octylphenyl-p-phenylenediamine, N-phenyl-N'-nonylphenyl - p - phenylenediamine, N-phenyl-N'-decylphenyl-p-phenylenediamine, N-phenyl-N'-undecylphenyl-p-phenylenediamine, N - phenyl-N'-dodecylphenyl-p-phenylenediamine, etc.

It is understood that mixtures containing the N-phenyl-N'-alkylphenyl-p-phenylenediamine may be used and in some cases are preferred. For example, a product being sold commercially by Goodyear Tire and Rubber Company under the trade name of "Wingstay 100" for use as an antioxidant in rubber comprises a mixture containing N-phenyl-N'-alkylphenyl-p-phenylenediamine.

From the above discussion it will be seen that the present invention provides a novel synergistic mixture of a p-phenylenediamine antiozonant and a N-phenyl-N'-alkylphenyl-p-phenylenediamine.

In another embodiment the present invention relates to a method of stabilizing rubber against cracking due to ozone which comprises incorporating therein an antiozonant mixture of a N,N'-dicycloalkyl-p-phenylenediamine and an N-phenyl-N'-alkylphenyl-p-phenylenediamine in synergistic proportions.

As hereinbefore set forth, the components are used in synergistic proportions. In one embodiment these may comprise from about 5% to about 95% of one component and from about 95% to about 5% of the other component. In most cases it is preferred to utilize these components in concentrations of from about 25% to about 75% of one component and from about 75% to about 25% of the other component. In a particularly preferred embodiment, the p-phenylenediamine antiozonant comprises from about 50% to about 90% and the N-phenyl-N'-alkylphenyl-p-phenylenediamine comprises from about 50% to about 10% by weight of the synergistic mixture.

The synergistic composition of the present invention is used in rubber in a concentration sufficient to effect the desired stabilization. The concentration may range from about 0.5% to about 5% and more particularly from about 1.5% to about 3% by weight of the rubber, although, in some cases higher or lower concentrations may be employed. These concentrations are based on the rubber hydrocarbon exclusive of the other components of the rubber composition and are used in this manner in the present specifications and claims. When desired, the synergistic mixture may be used along with an additional antioxidant and also is used along with other additives incorporated in rubber for specific purposes including accelerators, softeners, extenders, wax, reinforcing agents, etc.

When used along with an additional antioxidant it is understood that any suitable antioxidant may be employed including, for example, phenyl-beta-naphthylamine, 6 - phenyl - 2,2,4-trimethyl-1,2-dihydroquinoline, 2,2'-methylene-bis-(4-methyl-6-tert-butyl-phenol), 2,6-ditert-butyl-p-cresol, the reaction product of acetone and diphenylamine, etc. These antioxidants generally are used in a concentration of from about 0.5% to about 3% by weight of the rubber.

When desired, the synergistic mixture of the present invention also is used along with paraffin and/or microcrystalline wax. The wax generally is utilized in a concentration of from 0.5% to 3% by weight of the rubber.

In one embodiment the components of the synergistic mixture are added separately to the rubber formula. In another embodiment the components of the synergistic mixture are combined and then added to the rubber formula. In still another embodiment the synergistic mixture is admixed with the additional antioxidant, wax and/or other additives, and the mixture then is composited with one or more of the other components of the rubber formulation. In a preferred embodiment the synergistic mixture is incorporated in the latex prior to milling. In still another embodiment vulcanized rubber may be soaked, dipped or suspended in the synergistic mixture to apply a surface coating to the rubber, or the synergistic mixture may be sprayed, poured or otherwise contacted with the previously vulcanized rubber.

The synergistic mixture of the present invention is utilized in any rubber formulation subject to ozone cracking, including those used for automobile and truck tires and tubes, hose, belting, sheet and tread rubber, rubberized fabrics, molded goods, boots and shoes, etc., whether vulcanized in a mold, in open steam, in hot air, or in the cold by the so-called acid process. In another embodiment, the present invention can be utilized for the stabilization of adhesives, elastomers, etc., which tend to crack due to ozone.

When the synergistic mixture is added to a liquid such as rubber pigment or an oil, it is dissolved therein in the desired proportions. When the synergistic mixture is added to a solid substrate, it is incorporated therein by milling, mastication, etc. The synergistic mixture may be utilized as such or as a solution or dispersion or as a powder, paste, etc.

In general, rubber is classified as a vulcanizable diene hydrocarbon rubber and comprises polymers of conjugated 1,3-dienes either as polymers thereof or as copolymers thereof with other polymerizable compounds. In one embodiment the rubber is a synthetic rubber including, for example, butadiene-styrene copolymer rubber presently referred to in the art as SBR rubber, buna-N rubber (NBR) produced from butadiene and acrylonitrile, butyl rubber produced from butadiene and isobutylene, neoprene, etc. The natural rubbers include Hevea rubber, Cauotchouc, Balata, Gutta Percha, etc. It is understood that the term rubber as used in the present specifications and claims is intended to include both synthetic rubber and natural rubber which undergo cracking due to ozone.

The following examples are introduced to illustrate further the novelty and utility of the present invention but not with the intention of unduly limiting the same.

*Example I*

The base rubber used in this and some of the following examples had the following receipe:

TABLE I

| Ingredient: | Parts by weight |
|---|---|
| SBR–1502 | 100 |
| Furnace black | 40 |
| Zinc oxide | 3 |
| Stearic acid | 2 |
| Sulfur | 2 |
| Accelerator [1] | 1.25 |

[1] N-cyclohexyl-2-benzothiazole-sulfenamide.

A sample of rubber of the above receipe was used as the blank or control sample. Various combinations of additives were incorporated to other samples of the rubber during milling, as will be specifically set forth below. All of the samples were formed into strips 6″ long, 0.75″ wide and 0.080″ thick and cured individually for 40 minutes at 284° F. The different samples were elongated 10% or 20% and evaluated in an ozone cabinet at 100° F. in an atmosphere containing 50 parts of ozone per 100 million parts of air. The time to first visible cracks was determined and is reported in the following examples.

In order to more closely simulate actual conditions under which tires are used, including both the heat generated due to friction and the exposure to oxygen in the atmosphere, the rubber samples were exposed to oxygen at 194° F. for different times ranging up to four days, and the samples then were evaluated in the ozone cabinet in the manner described above. The results reported in this example include such prior temperature aging when indicated.

The antiozonant used in this example was N,N′-dicyclohexyl-p-phenylenediamine. The synergistic compound was "Wingstay 100" which, as hereinbefore set forth, comprises N-phenyl-N′-alkylphenyl - p - phenylenediamine. More particularly, "Wingstay 100" has been found by analysis to consist of about 50% of N-phenyl-N′-methylphenyl-p-phenylenediamine, about 24% of N,N′-di-methylphenyl-p-phenylenediamine and the remainder being N,N′-diphenyl-p-phenylenediamine and small amounts of three other compounds. The results of runs in the ozone cabinet of different samples containing a variety of a combination of additives are reported in the following table. In the interest of simplicity N,N′-dicyclohexyl-p-phenylenediamine is abbreviated "DCPPD." Table II reports the results in which the rubber samples were elongated 10%.

TABLE II

| Run No. | Additive | Concentration (Pts. by Wt.) | Hours to First Crack Days at 194° F. | |
|---|---|---|---|---|
| | | | 0 | 2 |
| 1 | None | | <2 | <2 |
| 2 | DCPPD [1] | 1.5 | >168 | ~25 |
| 3 | Wingstay 100 | 2.0 | <2 | <4 |
| 4 | DCPPD plus Wingstay 100 | 1.5 1.0 | >168 | >168 |

[1] N,N′-dicyclohexyl-p-phenylenediamine.

From the data in the above table it will be seen that the samples of rubber without additive (Run No. 1) underwent cracking within two hours. Similarly, it will be noted that the samples of rubber containing "Wingstay 100" also underwent cracking in less than 4 hours. It has been observed in evaluations of this type that there is a small but distinguishable increase in time to first crack upon aging in the presence of air. However, it will be noted that this increase is negligible.

From the data in Run No. 2 it will be seen that the sample of rubber containing N,N′-dicyclohexyl-p-phenylenediamine originally withstood cracking for greater than 168 days but upon aging for two days the stability of the rubber sample decreased to about 25 days. In contrast the samples of rubber containing both N,N′-dicyclohexyl-p-phenylenediamine and Wingstay 100 (Run No. 4) did not undergo cracking for greater than 168 days either before aging or after aging for two days in the manner described above. This clearly demonstrates a synergistic activity between the antiozonant and the antioxidant to improve the antiozonant properties of the rubber.

*Example II*

The data in Table III reports the results in which rubber samples corresponding to those reported in Example I were elongated 20% and then were evaluated in the ozone cabinet in the manner described above.

TABLE III

| Run No. | Additive | Concentration (Pts. by Wt.) | Hours to First Crack Days at 194° F. | |
|---|---|---|---|---|
| | | | 0 | 1 |
| 5 | None | | <2 | <2 |
| 6 | DCPPD [1] | 1.5 | >168 | <24 |
| 7 | Wingstay 100 | 2.0 | <2 | <2 |
| 8 | DCPPD plus Wingstay 100 | 1.5 1.0 | >168 | >168 |

[1] N,N′-dicyclohexyl-p-phenylenediamine.

From the data in the above table it will be seen that the same situation occurs when the rubber samples were aged and elongated at 20% as occurred when the samples were aged and elongated 10%. This example further demonstrates the synergistic activity of the mixture of antiozonant and antioxidant to improve the stability of the rubber samples against cracking due to ozone.

*Example III*

Another series of runs were made in the same manner as described in Example I except that different concentrations of the antiozonant were employed. These runs were made in the same manner as described in Example I and the results are reported in the following table for the rubber samples elongated 10%.

TABLE IV

| Run No. | Additive | Concentration (Pts. by Wt.) | Hours to First Crack Days at 194° F. | |
|---|---|---|---|---|
| | | | 0 | 4 |
| 9 | None | | <2 | <2 |
| 10 | DCPPD [1] | 2.0 | >168 | <24 |
| 11 | Wingstay 100 | 2.0 | <2 | <4 |
| 12 | {DCPPD [1] plus Wingstay 100 | 2.0 1.0 | >168 | >168 |

[1] N,N'-dicyclohexyl-p-phenylenediamine.

From the data in the above table it will be seen that the use of the mixture of antiozonant and antioxidant again serves to considerably improve the stability of the rubber samples as compared to the use of the antiozonant or antioxidant alone.

*Example IV*

The following table reports the results of evaluations made using the concentrations of antiozonant and antioxidant as described in Example III except that the rubber samples were elongated 20% before exposure in the ozone cabinet.

TABLE V

| Run No. | Additive | Concentration (Pts. by Wt.) | Hours to First Crack Days at 194° F. | |
|---|---|---|---|---|
| | | | 0 | 1 |
| 13 | None | | <2 | <2 |
| 14 | DCPPD [1] | 2.0 | >168 | ~84 |
| 15 | Wingstay 100 | 2.0 | <2 | <2 |
| 16 | {DCPPD plus Wingstay 100 | 2.0 1.0 | >168 | >168 |

[1] N,N'-dicyclohexyl-p-phenylenediamine.

Here again the synergistic effect of the mixture of N,N'-dicyclohexyl-p-phenylenediamine and Wingstay 100 is demonstrated.

*Example V*

The synergistic mixture of this example comprises 60% by weight of N,N'-dicyclohexyl-p-phenylenediamine and 40% by weight of N-phenyl-N'-methylphenyl-p-phenylenediamine. The synergistic mixture is incorporated in a concentration of 3% by weight in a rubber having the base formula set forth in Example I.

*Example VI*

The synergistic mixture of this example comprises 70% by weight of N,N'-dicyclopentyl-p-phenylenediamine and 30% by weight of N-phenyl-N'-dimethylphenyl-p-phenylenediamine. The synergistic mixture is incorporated in a concentration of 2.5% by weight in another sample of the rubber having the basic formula set forth in Example I.

*Example VII*

The synergistic mixture of this example is composed of 75% by weight of N,N'-dicyclohexyl-p-phenylenediamine and 25% by weight of N-phenyl-N'-ethylphenyl-p-phenylenediamine. The synergistic mixture is incorporated in a concentration of 3% by weight in a sample of natural rubber and serves to increase the stability thereof against ozone cracking.

I claim as my invention:

1. A mixture of from about 50% to about 90% by weight of N,N'-dicycloalkyl-p-phenylenediamine and from about 50% to about 10% by weight of a synergist composition containing at least about 50% of N-phenyl-N'-methylphenyl-p-phenylenediamine in admixture with smaller amounts of N,N'-di-methylphenyl-p-phenylene diamine and N,N'-diphenyl-p-phenylene diamine.

2. The mixture of claim 1 further characterized in that said N,N'-dicycloalkyl-p-phenylenediamine is N,N'-dicyclohexyl-p-phenylenediamine.

3. The mixture of claim 1 further characterized in that said mixture is in admixture in a concentration of from about 0.5% to about 5% by weight with a vulcanizable diene hydrocarbon rubber normally subject to cracking due to ozone.

4. The mixture of claim 2 further characterized in that said mixture is in admixture in a concentration of from about 0.5% to about 5% by weight with a vulcanizable diene hydrocarbon rubber normally subject to cracking due to ozone.

References Cited by the Examiner

UNITED STATES PATENTS 3,027,351  3/1962  Lichty _____ 260—45.9
3,163,616  12/1964  Stahly _____ 260—45.9

OTHER REFERENCES

"Compounding Ingredients for Rubber," 3rd ed., 1961, Cuneo Press of New England, p. 140 relied on. Copy in Scientific Library.

DONALD E. CZAJA, *Primary Examiner.*

LEON J. BERCOVITZ, *Examiner.*

H. E. TAYLOR, *Assistant Examiner.*